United States Patent
Masaru

(10) Patent No.: US 9,189,715 B2
(45) Date of Patent: Nov. 17, 2015

(54) IMAGE FORMING APPARATUS THAT PRINTS OUT MULTI-GRADATION MONOCHROME IMAGE MAINTAINING GRADATION REPRODUCIBILITY, AND IMAGE FORMING METHOD

(71) Applicant: KYOCERA Document Solutions Inc., Osaka (JP)

(72) Inventor: Matsuo Masaru, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/496,757

(22) Filed: Sep. 25, 2014

(65) Prior Publication Data

US 2015/0085322 A1    Mar. 26, 2015

(30) Foreign Application Priority Data

Sep. 26, 2013 (JP) ................................. 2013-200628

(51) Int. Cl.
- *G06K 1/00* (2006.01)
- *G06K 15/02* (2006.01)
- *H04N 1/407* (2006.01)

(52) U.S. Cl.
CPC ........ *G06K 15/1878* (2013.01); *G06K 15/1822* (2013.01); *H04N 1/4074* (2013.01)

(58) Field of Classification Search
None
See application file for complete search history.

(56) References Cited

U.S. PATENT DOCUMENTS

| | | | | |
|---|---|---|---|---|
| 5,198,892 A | * | 3/1993 | Misawa ......................... | 348/578 |
| 5,977,946 A | * | 11/1999 | Mizobata ....................... | 345/418 |
| 6,154,288 A | * | 11/2000 | Watanabe ...................... | 358/1.9 |
| 7,006,668 B2 | * | 2/2006 | Iguchi et al. .................. | 382/108 |

FOREIGN PATENT DOCUMENTS

JP    2004-206426 A    7/2004

* cited by examiner

*Primary Examiner* — Steven Kau
(74) *Attorney, Agent, or Firm* — McDonnell Boehnen Hulbert & Berghoff LLP

(57) ABSTRACT

The image forming apparatus includes an input luminance range recognition unit, an output luminance range recognition unit, and a luminance range expansion unit. The input luminance range recognition acquires input luminance information from multi-gradation monochrome image data, generates a luminance histogram, and determines, based on a minimum luminance value and a maximum luminance value of the luminance histogram, an input luminance range. The output luminance range recognition unit determines an output luminance range. The luminance range expansion unit performs a mapping process for mapping input luminance information of pixels within the image range into the output luminance range, and expands the input luminance range to a maximum luminance range.

14 Claims, 11 Drawing Sheets

IMAGE FORMING APPARATUS THAT PRINTS OUT MULTI-GRADATION MONOCHROME IMAGE MAINTAINING GRADATION REPRODUCIBILITY, AND IMAGE FORMING METHOD

INCORPORATION BY REFERENCE

This application is based on, and claims priority to corresponding Japanese Patent Application No. 2013-200628, filed in the Japan Patent Office on Sep. 26, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus that prints out a multi-gradation monochrome image maintaining gradation reproducibility, and an image forming method.

BACKGROUND

In the medical field, multi-gradation monochrome images are generated by medical image generation apparatuses such as computed tomography (CT) systems, magnet resonance imaging (MRI) systems, computed radiography (CR) systems, flat panel detectors (FPD), and ultrasonic diagnostic apparatuses and used for diagnoses and other purposes.

At the time of utilizing a multi-gradation monochrome image, the multi-gradation monochrome image is displayed in a display apparatus such as, for example, a cathode ray tube (CRT), or the displayed multi-gradation monochrome image is printed on paper by an output apparatus such as a printer.

It is important to maintain gradation reproducibility in the display apparatus and the output apparatus, so that the multi-gradation image can be utilized for its intended purpose.

Since, in an output apparatus such as, for example, a printer, characteristics of each unit are easy to subtlety change, maintenance of gradation reproducibility is typically performed by calibration.

However, when the characteristic of each unit in the output apparatus greatly changes, it becomes difficult to maintain the gradation reproducibility using the calibration, and a reproducible gradation range (the number of gradations) is reduced in some cases. In this case, since it is difficult to accurately reproduce gradations outside the reduced gradation range on the paper, it may become difficult to detect a tumor or the like that was detectable before that.

One known technique involves increasing a gradient in a portion of an optical density area. In this case, the balance of an entire image is deteriorated, and a situation in which the gradation reproducibility is reduced may occur.

In particular, in a medical image system, there is the necessity of focusing on and observing in detail an image range within a medical image, suspected of being a tumor or the like. However, in the past, in such a case, there has been a limit on securing the gradation reproducibility of an image within a focused image range while achieving the gradation balance of the entire image.

SUMMARY

The present disclosure relates to an image forming apparatus that prints out a multi-gradation monochrome image maintaining gradation reproducibility within a portion of an image range while maintaining balance as a whole, at the time of observing the portion of the image range, and an image forming method.

In one embodiment, an image forming apparatus of the present disclosure includes an image forming unit, an input luminance range recognition unit, an output luminance range recognition unit, and a luminance range expansion unit. The image forming unit prints an image, based on a printing instruction. The input luminance range recognition unit i) acquires input luminance information from multi-gradation monochrome image data in which a portion of an image range is selected, ii) generates a luminance histogram, and iii) determines, based on a minimum luminance value and a maximum luminance value of the luminance histogram, an input luminance range in which input luminance information of the image range is distributed. The output luminance range recognition unit determines an output luminance range supported by the image forming unit. The luminance range expansion unit performs a mapping process for mapping input luminance information of pixels within the image range into the output luminance range, and ii) expands the input luminance range to a maximum luminance range to be dealt with by the image forming unit.

In another embodiment, an image forming method of the present disclosure includes acquiring input luminance information from multi-gradation monochrome image data in which a portion of an image range is selected. The method also includes generating a luminance histogram. The method also includes determining, based on a minimum luminance value and a maximum luminance value of the luminance histogram, an input luminance range in which input luminance information of the image range is distributed. The method also includes determining an output luminance range to be dealt with by the image forming unit. The method also includes performing a mapping process for mapping input luminance information of pixels within the image range into the output luminance range. The method also includes expanding the input luminance range to a maximum luminance range to be dealt with by the image forming unit.

In yet another embodiment, a terminal apparatus serves as an information processing apparatus, and includes an operation unit, an external interface connected to a display apparatus, a control unit, and a display execution instruction unit. The operation unit receives data from an image generation apparatus and receives an input operation indicating a selection of an image range in the multi-gradation monochrome image. The control unit operates as an input luminance range recognition unit, an output luminance range recognition unit, a luminance range expansion unit, and a negative-positive inversion unit. The display execution instruction unit realizes a display execution instruction function, and performs a process for displaying a multi-gradation monochrome image on the display apparatus.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An embodiment of the present disclosure is applied to an information processing apparatus such as a personal computer, in addition to an image forming apparatus such as a printer or a digital multifunction peripheral (MFP), used for printing. In a case of being applied to the image forming apparatus, an output unit is an image forming unit such as an engine, which performs printing on paper, and in a case of being applied to the information processing apparatus, the output unit is a display apparatus such as a monitor.

First Embodiment

Figure 1:
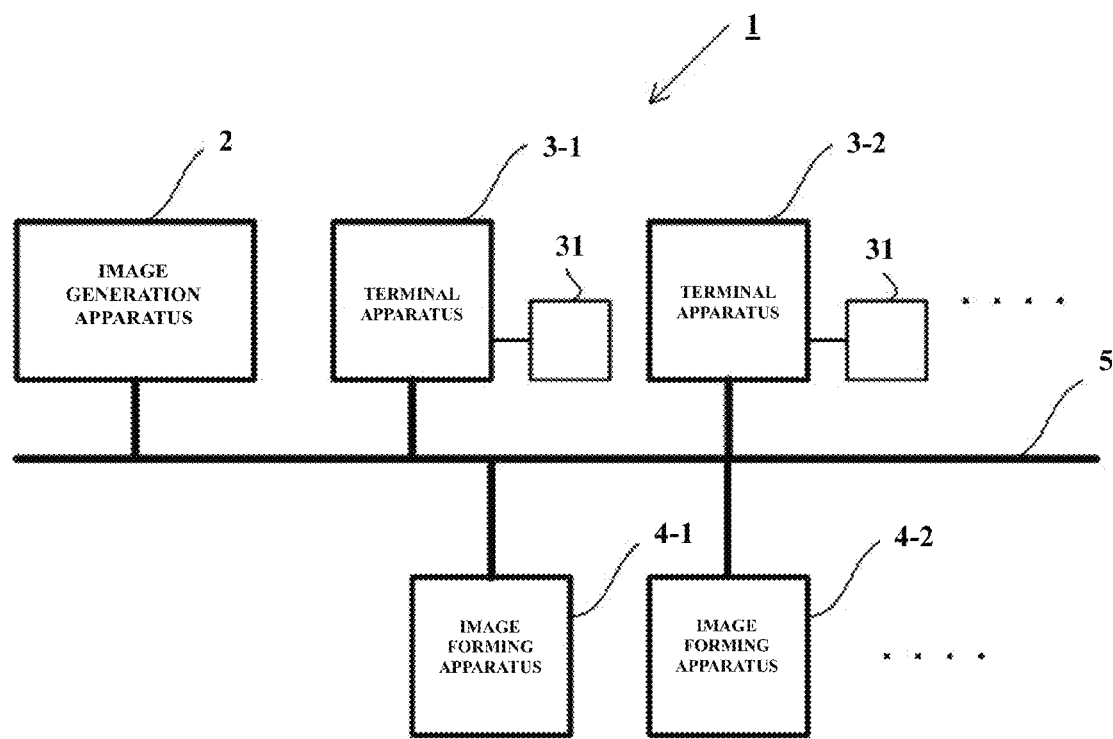
FIG. 1 is a schematic diagram illustrating a block configuration of an image forming system according to a first embodiment of the present disclosure.

FIG. 1 is a schematic diagram illustrating the block configuration of an image forming system 1 according to a first embodiment of the present disclosure.

The image forming system 1 is configured as a medical image system. The image forming system 1 includes an image generation apparatus 2, terminal apparatuses 3-1, 3-2, . . . (hereinafter, collectively called terminal apparatuses 3 in some cases), and image forming apparatuses 4-1, 4-2, . . . (hereinafter, collectively called image forming apparatuses 4 in some cases), connected to one another by a network 5 such as an internet (e.g. the Internet) or a LAN. In addition, the image forming system 1 is not limited to the medical image system, and may be applied to any system for printing multi-gradation monochrome image data.

The image generation apparatus 2 is, for example, a CT, MRI, CR, FDP, ultrasonic diagnostic apparatus, or the like, and generates multi-gradation monochrome image data serving as medical image data in which a plurality of gradations are expressed by luminance information.

Figure 2:
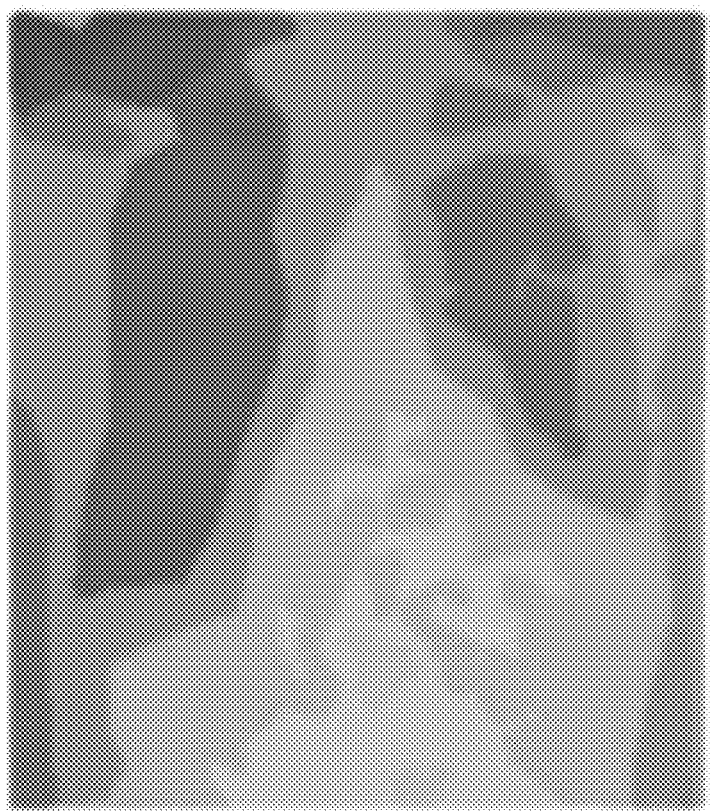
FIG. 2 is a schematic diagram illustrating an example of a multi-gradation monochrome image displayed in a terminal apparatus in the image forming system.

The terminal apparatuses 3 are information processing apparatuses such as personal computers, and each includes a display apparatus 31 such as a monitor. Each of the terminal apparatuses 3 receives multi-gradation monochrome image data generated by the image generation apparatus 2, and displays such a monochrome image illustrated in, for example, FIG. 2, in one of the display apparatuses 31. In addition, each of the terminal apparatuses 3 instructs one of the image forming apparatuses 4 to print the multi-gradation monochrome image displayed in one of the display apparatuses 31, as necessary.

The image forming apparatuses 4 are color printers, color digital MFPs, or the like, and each prints out a monochrome image on paper, based on a printing instruction from one of the user terminal apparatuses 3. At that time, the image forming apparatuses 4 each perform a process for expanding the input luminance range of an image within an image range selected on a user terminal apparatus 3, performing mapping within the expanded luminance range, and converting the mapped information into expanded luminance information.

Figure 3:
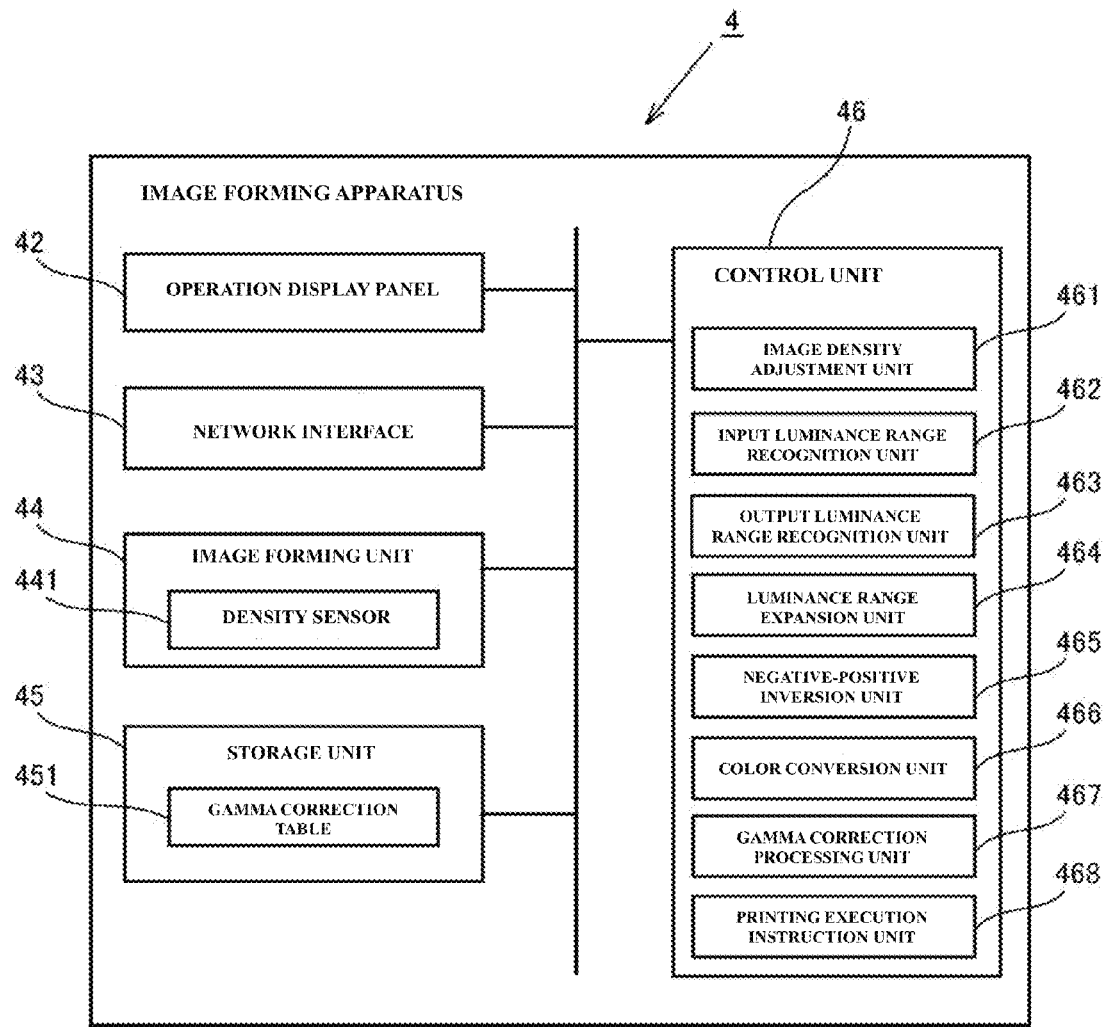
FIG. 3 is a schematic diagram illustrating a functional block configuration of the image forming apparatus in the image forming system.

FIG. 3 is a schematic diagram illustrating the functional block configuration of each of the image forming apparatuses 4.

The image forming apparatuses 4 each include an operation display panel 42, a network interface 43, an image forming unit 44, a storage unit 45, a control unit 46, and so forth.

The operation display panel 42 includes a touch panel type liquid crystal display screen or the like, and causes various kinds of input operations for the corresponding image forming apparatus 4, displaying of the input results thereof, and so forth, to be performed.

The network interface 43 transmits and receives pieces of data to and from external apparatuses including the image generation apparatus 2 and the user terminal apparatuses 3 via the network 5.

The image forming unit 44 is an output unit that forms an image on paper, based on a printing instruction, and prints out the image. The printing instruction is received, as a print job, from one of the terminal apparatuses 3 or the like via, for example, the network interface 43.

In the first embodiment, when receiving the printing instruction for multi-gradation monochrome image data from one of the terminal apparatuses 3, the image forming unit 44 performs a printout on the multi-gradation monochrome image data.

By overlaying the gradation images of cyan (C), magenta (M), yellow (Y), and black (K) serving as the color space of a typical color printer on each other, the image forming unit 44 prints a color image or a monochrome image. In addition, the multi-gradation monochrome image may be printed using only the gradation image of black (K).

The image forming unit 44 includes a density sensor 441. The density sensor 441 includes a photo sensor, and detects the density of a density adjustment image formed by a calibration process. A detected density based on the density sensor 441 is used for generating a gamma correction table.

The control unit 46 is an arithmetic apparatus such as a central processing unit (CPU), and performs various kinds of processing operations and various kinds of control operations by executing programs.

The storage unit 45 includes, for example, a read only memory (ROM) storing therein the programs, a random access memory (RAM) serving as a working area, a hard disk drive (HDD) serving as an auxiliary storage apparatus, and so forth.

The control unit 46 executes one or more programs in the storage unit 45, causing the image forming apparatus 4 to realize an image density adjustment unit 461, an input luminance range recognition unit 462, an output luminance range recognition unit 463, a luminance range expansion unit 464, a negative-positive inversion unit 465, a color conversion unit 466, a gamma correction processing unit 467, and a printing execution instruction unit 468.

The image density adjustment unit 461 realizes an image density adjustment (calibration) function. For example, calibration for maintaining gradation reproducibility may be executed when there is a change in, for example, humidity, temperature, or the number of print copies.

The image density adjustment unit 461 causes the image forming unit 44 to form the density adjustment image of CMYK on paper, causes the density sensor 441 to read the density adjustment image, and detects a density. The image density adjustment unit 461 generates a gamma correction table 451 for adjusting the density so that the density of the density adjustment image becomes a target density, and stores the gamma correction table 451 within the storage unit 45 or updates the gamma correction table 451.

As a result of executing the calibration, an output luminance range serving as a width between a minimum luminance and a maximum luminance based on the maximum densities of respective colors of CMYK reproducible in the image forming unit 44 is confirmed, and stored within the storage unit 45.

The input luminance range recognition unit 462 realizes an input luminance range recognition function, and determines an input luminance range in which input luminance information within a portion of an image range selected, as a processing target, from the multi-gradation monochrome image data by a user is distributed.

Figure 7:
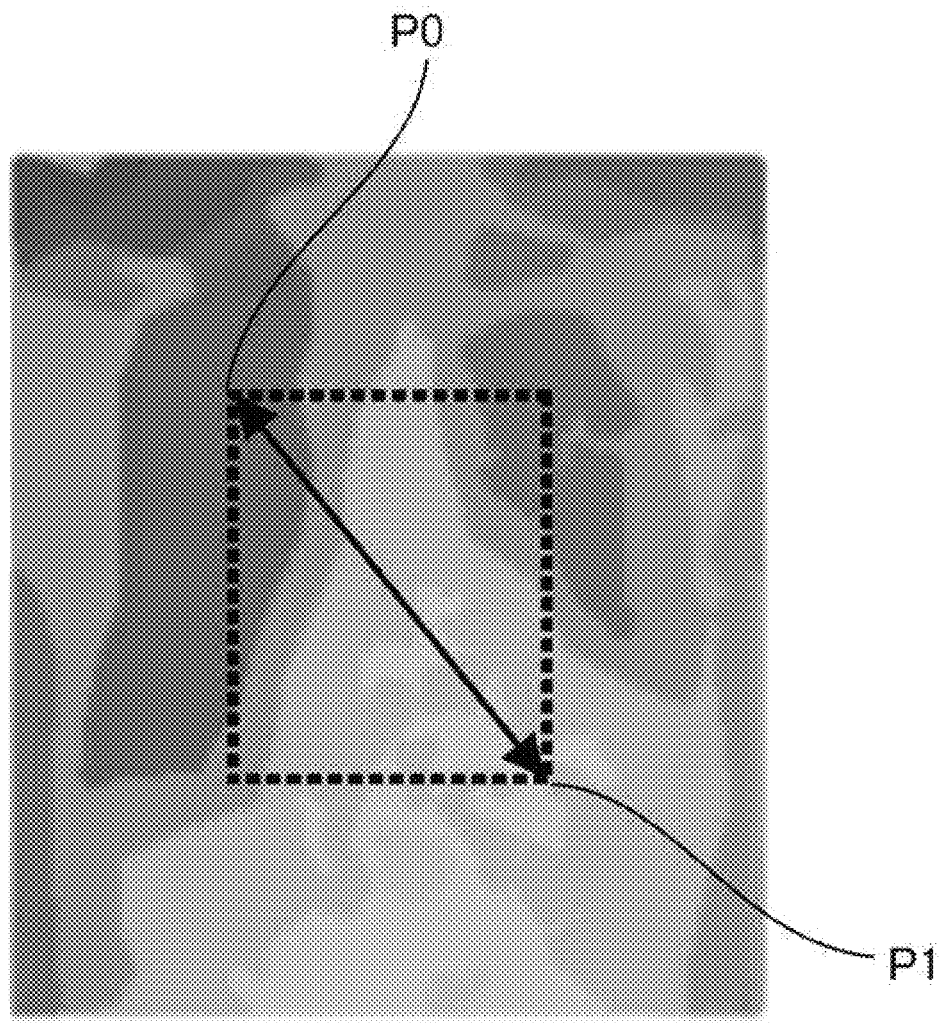
FIG. 7 is a diagram illustrating an example of a selection operation for an image range of a multi-gradation monochrome image displayed in a terminal apparatus.

The input luminance range recognition unit 462 generates a luminance histogram from the input luminance information of an image within the selected portion of an image range, and determines, as an input luminance range, a luminance range between a minimum luminance value and a maximum luminance value of the luminance histogram. In addition, an operation for selecting, as a processing target, a portion of an image range within the multi-gradation monochrome image data is performed by the user after, for example, one of the display apparatuses 31 is caused to display the multi-gradation monochrome image in the corresponding terminal apparatus 3 as illustrated in FIG. 7.

The output luminance range recognition unit 463 realizes an output luminance range recognition function, and determines an output luminance range able to be dealt with by the image forming unit 44 for outputting the multi-gradation monochrome image. In the first embodiment, the output luminance range recognition unit 463 acquires the output luminance range stored in the storage unit 45.

The luminance range expansion unit 464 realizes a luminance range expansion function, maps input luminance information within the selected image range into the output luminance range, and expands the input luminance range within the range of the output luminance range.

In the first embodiment, the luminance range expansion unit 464 expands the input luminance range (luminance histogram) determined in the input luminance range recognition unit 462 up to a maximum luminance range able to be expressed in the image forming unit 44. In this regard, however, this expansion of the luminance range does not necessarily have to be expanded up to the maximum luminance range able to be expressed in the image forming unit 44.

The negative-positive inversion unit 465 realizes a negative-positive inversion function, and performs a negative-positive inversion process on the input luminance information of an image located around the image range selected in the multi-gradation monochrome image data (an image located outside the image range). In this regard, however, the negative-positive inversion process may be omitted.

The color conversion unit 466 realizes a color conversion function, and generates multi-gradation monochrome image data for printing, based on after-expansion multi-gradation monochrome image data including expanded luminance information.

The color conversion unit 466 converts the after-expansion multi-gradation monochrome image data into CMYK values serving as the color space of process colors of the image forming unit 44, and generates the multi-gradation monochrome image data.

The gamma correction processing unit 467 realizes a gamma correction processing function, and performs a gamma correction process on the multi-gradation monochrome image data converted in the color conversion unit 466, with reference to the gamma correction table 451.

The printing execution instruction unit 468 realizes a printing execution instruction function, and causes the image forming unit 44 to form a monochrome image on paper, based on the multi-gradation monochrome image data for printing, generated via the gamma correction and so forth.

Figure 4:
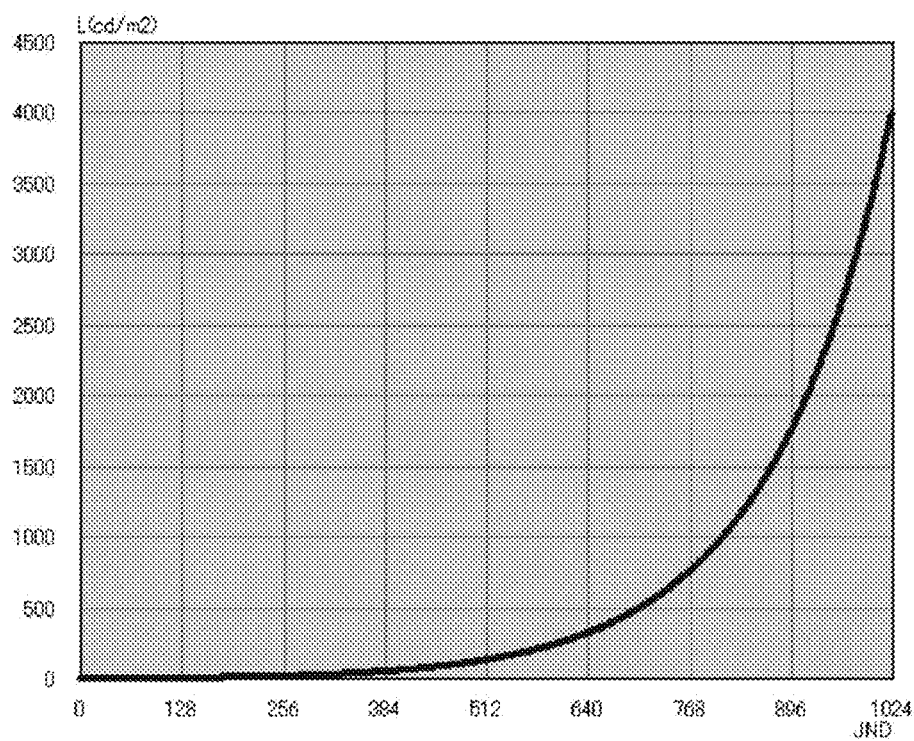
FIG. 4 is a graph of a luminance-discrimination area characteristic based on a GSDF of a DICOM standard.
Figure 5:
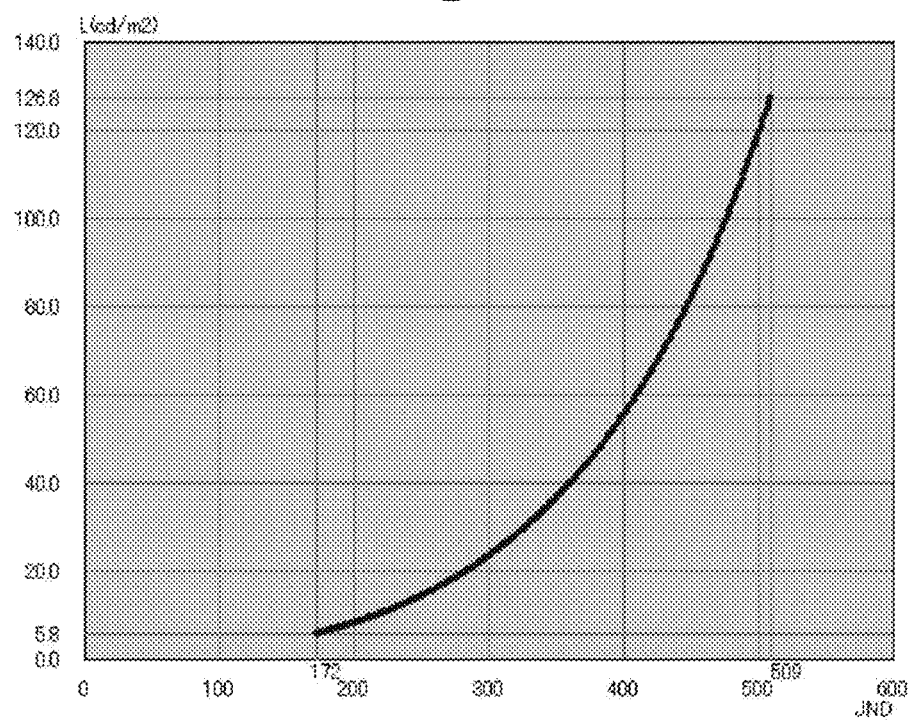
FIG. 5 is a graph of a luminance-discrimination area characteristic at the time of reproducing gradations on paper using an image forming apparatus.

FIG. 4 is the graph of a luminance-discrimination area characteristic based on a GSDF (Grayscale Standard Display Function) of the DICOM (Digital Imaging and Communications in Medicine) standard (DICOM PS3.14 2014b—Grayscale Standard Display Function), and FIG. 5 is the graph of a luminance-discrimination area characteristic at the time of reproducing gradations on paper using an image forming apparatus.

In general, in a case of the medical terminal apparatuses 3, in conformity to the GSDF in FIG. 4, for example, the gradations of a general image are reproduced in the range of about 100 to 200 $cd/m^2$, the gradations of a mammography image are reproduced in the range of about 200 to 800 $cd/m^2$, and the gradations of an X-ray image are reproduced in the range of about 300 to 400 $cd/m^2$.

In FIG. 4, the values of just-noticeable differences (JNDs) for luminances within the luminance range of 0 to 4500 $cd/m^2$ are plotted. The JDN is a luminance difference of a given target, just (minimally) recognizable by an average observer, and called a discrimination area.

Gradations reproducible on paper by the image forming apparatus 4 have the output luminance range of 5.8 to 126.8 cd/m² in accordance with the characteristic in FIG. 5, in other words, a narrow gradation range corresponding to the output luminance range.

In other words, it is difficult for the image forming apparatus 4 to reproduce, on paper, gradations of the multi-gradation monochrome image (for example, a medical image) reproducible in the terminal apparatus 3.

In the medical image, even when gradations are reproducible on paper, when there is the urgent necessity of focusing on and observing in detail an image range suspected of being a tumor or the like, it is desirable that a finer gradation difference makes it easy to detect a tumor or the like.

At the time of outputting an image based on printing in the image forming apparatus 4, an image process in the printing system 1 of the first embodiment improves gradation reproducibility within a focused portion of an image range while achieving a balance on the whole.

Figure 6:
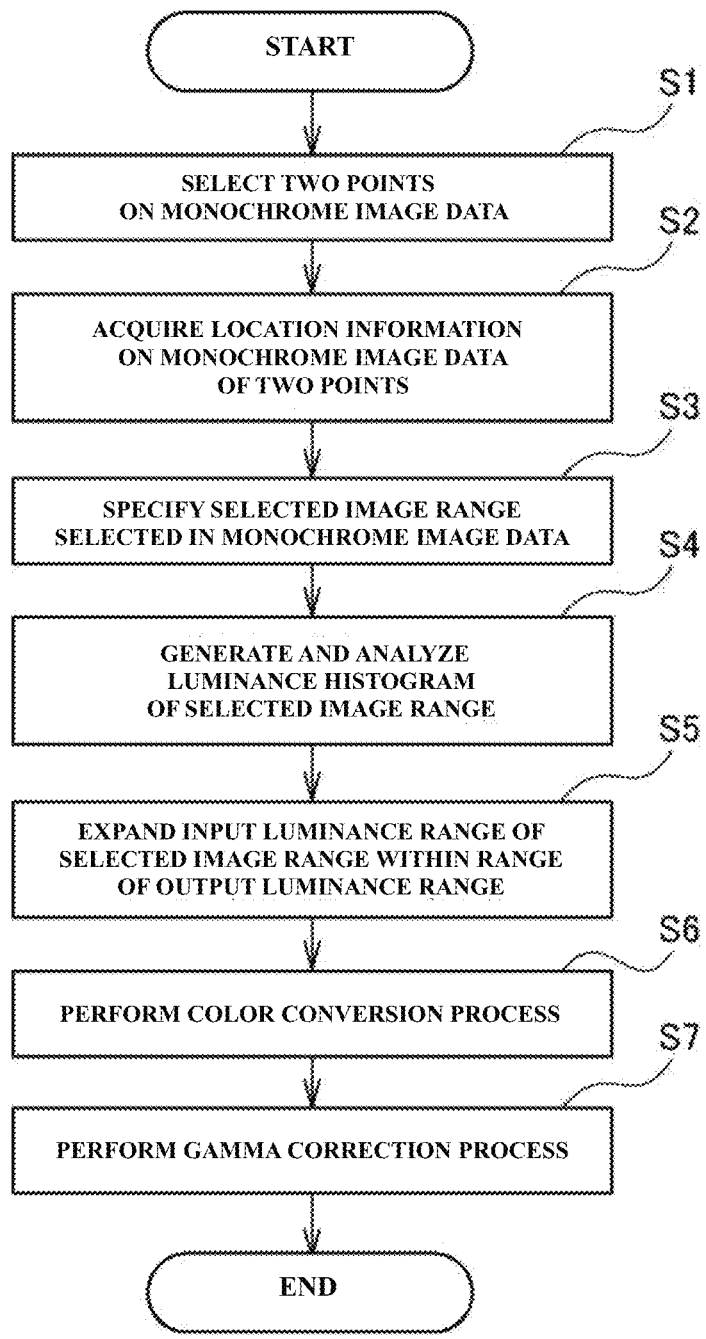
FIG. 6 is a flowchart of an image process including a luminance range expansion process based on an image forming apparatus.

FIG. 6 is the flowchart of an image process including a luminance range expansion process based on the image forming apparatus 4.

The image process in FIG. 6 is started by receiving, for example, a printing instruction from one of the terminal apparatuses 3. At the time of the printing instruction by the terminal 3, a selection operation is performed for selecting a portion of an image range to serve as a processing target within a multi-gradation monochrome image as a monitor image, displayed in the display apparatus 31.

FIG. 7 is a schematic diagram illustrating an example of a selection operation for an image range in a terminal apparatus. In this example, the user selects a rectangular area on a monitor image (multi-gradation monochrome image) displayed in the display apparatus 31. At the time of selecting the rectangular area, such as by moving a cursor from a starting point P0 to an ending point P1, the rectangular area whose end points are the starting point P0 and the ending point P1 is drawn.

On the terminal apparatus 3, a printing instruction is performed on the multi-gradation monochrome image in which the image range is selected. The image forming apparatus 4 receives the printing instruction, and thus, the image process illustrated in FIG. 6 is started.

In a step S1 in FIG. 6, two selected points within the image are selected. In this processing operation, the luminance range recognition unit 462 selects the two points on monochrome image data and specifies the image range. In the example of FIG. 7, the two points of the starting point P0 and the ending point P1 are selected.

In a step S2, the location information of the two selected points within the image is acquired. In this processing operation, the luminance range recognition unit 462 acquires the location information on the monochrome image data of the two points selected in the step S1.

In a step S3, an image range to serve as a processing target is identified. In this processing operation, first the input luminance range recognition unit 462 indicates a selected image range selected within the multi-gradation monochrome image data, based on the location information of the two points acquired in the step S2. In the example of FIG. 7, the range of a rectangle indicated by dotted lines is identified as the selected image range, based on the location information of each of the starting point P0 and the ending point P1.

In a step S4, the analysis of a luminance histogram of the selected image range is performed. In this processing operation, the input luminance range recognition unit 462 acquires pieces of input luminance information within the selected image range from the multi-gradation monochrome image data, and generates the distribution of these pieces of input luminance information, in other words, the luminance histogram. In addition, the input luminance range recognition unit 462 determines the input luminance range of the selected image range, based on a minimum luminance value and a maximum luminance value of the generated luminance histogram.

In a step S5, expansion of the input luminance range of the selected image range is performed. In this processing operation, the luminance range expansion unit 464 maps the input luminance information (luminance values) of pixels within the selected image range into an output luminance range, and expands the input luminance range within the range of the output luminance range. In addition, the output luminance range recognition unit 463 acquires the output luminance range from the storage unit 45.

Figure 8:
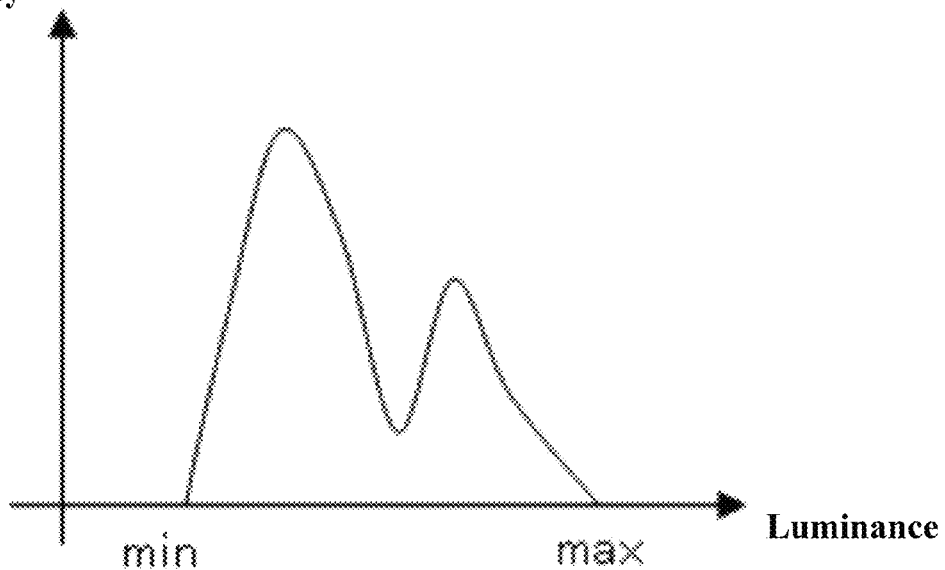
FIG. 8 is a graph of a luminance histogram of a selected image range within multi-gradation monochrome image data.
Figure 9:
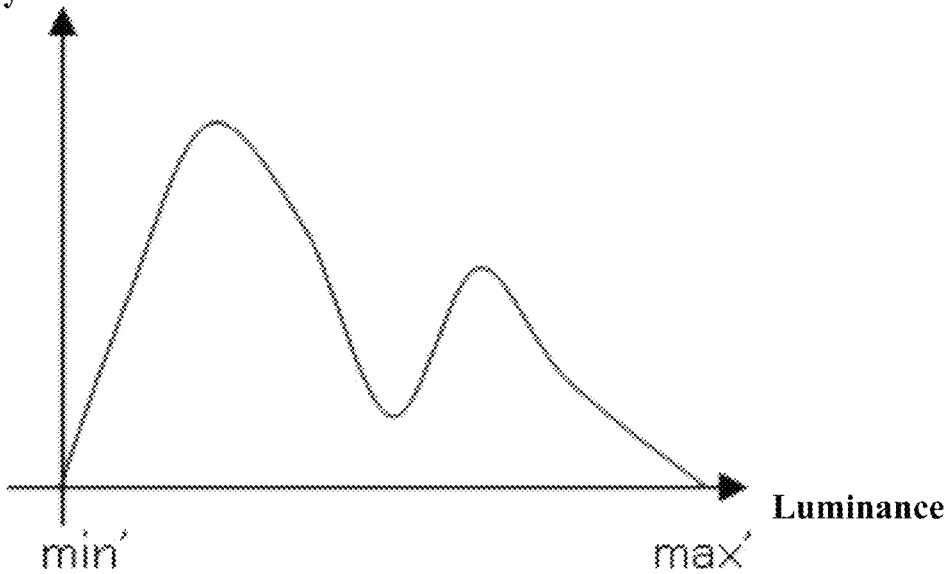
FIG. 9 is a graph of an expanded luminance histogram in which a luminance range of the luminance histogram is expanded.

FIG. 8 is the graph of the luminance histogram of the selected image range within the multi-gradation monochrome image data. FIG. 9 is the graph of an expanded luminance histogram in which the luminance range of the luminance histogram in FIG. 8 is expanded.

In the mapping process of the first embodiment, luminance values (luminance information) ranging from a minimum luminance value (min) of an input luminance range within the selected image range illustrated in FIG. 8 to a maximum luminance value (max) thereof are subjected to mapping, as luminance values (luminance information) ranging from a minimum luminance value (min') of an output luminance range illustrated in FIG. 9 to a maximum luminance value (max') thereof.

As for the mapping of the luminance values, an example of one of the image forming apparatuses 4 in which N-bit gradation expression is available will now be described. A luminance value after expansion is calculated based on the following Expression (1), using a maximum color value (max) and a minimum color value (min) of the luminance range in the luminance histogram in FIG. 8:

$$\text{Luminance Value after Expansion} = [(\text{Luminance Value before Expansion} - \text{Min})/(\text{Max} - \text{Min})] \cdot 2^N \quad (1)$$

The selected image range whose luminance range is expanded has a greater number of gradations than the number of gradations before expansion.

In addition, outside the selected image range within the multi-gradation monochrome image data, in the step S5, the negative-positive inversion unit 465 performs negative-positive inversion.

The mapping to the output luminance range within the selected image range and the negative-positive inversion outside the selected image range are performed for each pixel of the multi-gradation monochrome image data as described later.

In a step S6, a color conversion process is performed. In this processing operation, the color conversion unit 466 converts the after-expansion multi-gradation monochrome image data including the expanded luminance information into CMYK values serving as the color space of process colors of the image forming unit 44.

In a step S7, a gamma correction process is performed. In this processing operation, using the gamma correction table 451, the gamma correction processing unit 467 performs gamma correction on the multi-gradation monochrome image data color-converted in the step S6.

Once the gamma correction process in step S7 is completed, the series of image processing operations is terminated.

After that, the printing execution instruction unit 468 causes printing of the multi-gradation monochrome image based on the image forming unit 44 to be performed based on the multi-gradation monochrome image data subjected to the gamma correction and so forth.

Figure 10:
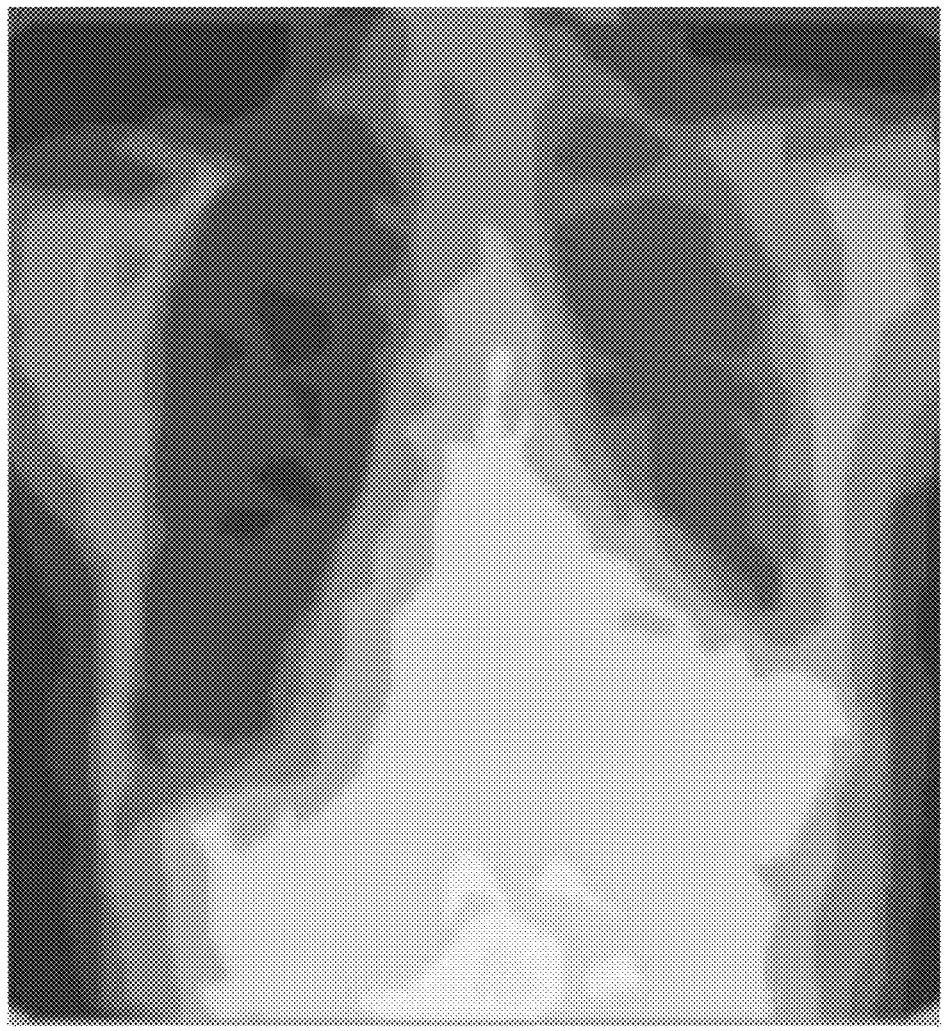
FIG. 10 is a schematic diagram illustrating an example of a multi-gradation monochrome image in a case where expansion of an input luminance range is applied to an entire image of multi-gradation monochrome image data.
Figure 11:
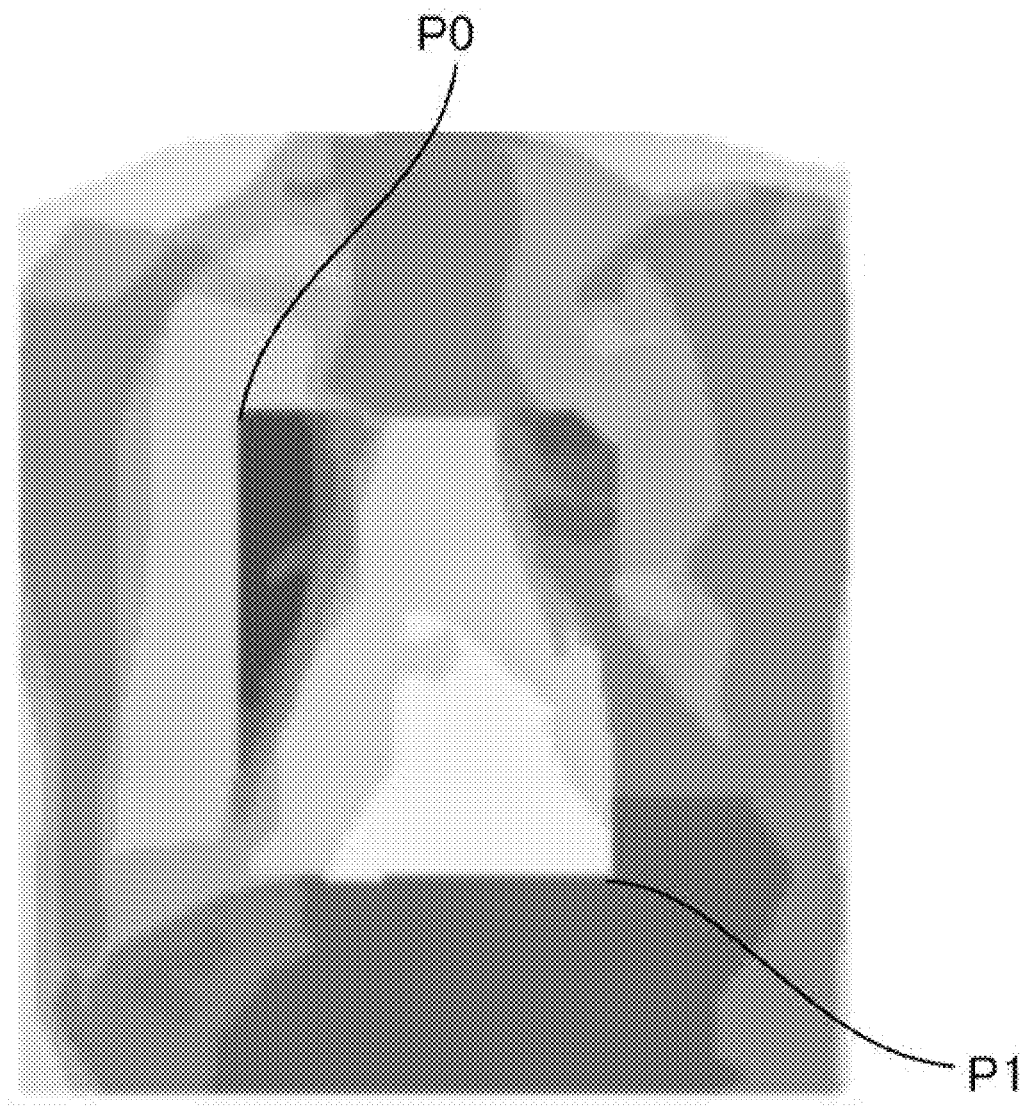
FIG. 11 is a schematic diagram illustrating an example of a multi-gradation monochrome image in a case where the expansion of the input luminance range is only applied to a selected image range of the multi-gradation monochrome image data.

FIG. 10 is a schematic diagram illustrating an example of a multi-gradation monochrome image in a case where expansion of an input luminance range is applied to an entire image of multi-gradation monochrome image data. FIG. 11 is a schematic diagram illustrating an example of a multi-gradation monochrome image in a case where the expansion of the input luminance range is only applied to a selected image range of the monochrome image data.

In FIG. 10, the input luminance range is expanded over the entire multi-gradation monochrome image data. Therefore, gradation reproducibility is reduced, and gradation crush occurs.

On the other hand, in the first embodiment, an input luminance range only within the selected portion of an image range within the multi-gradation monochrome image data is expanded, and negative-positive inversion is performed outside the selected image range while not performing the expansion of the input luminance range.

As a result, as illustrated in FIG. 11, the number of gradations within the selected image range increases, and a detailed image is output. In addition, a portion outside the selected image range is subjected to the negative-positive inversion. Therefore, an image within the selected image range is enhanced, and identification becomes easier.

Figure 12:
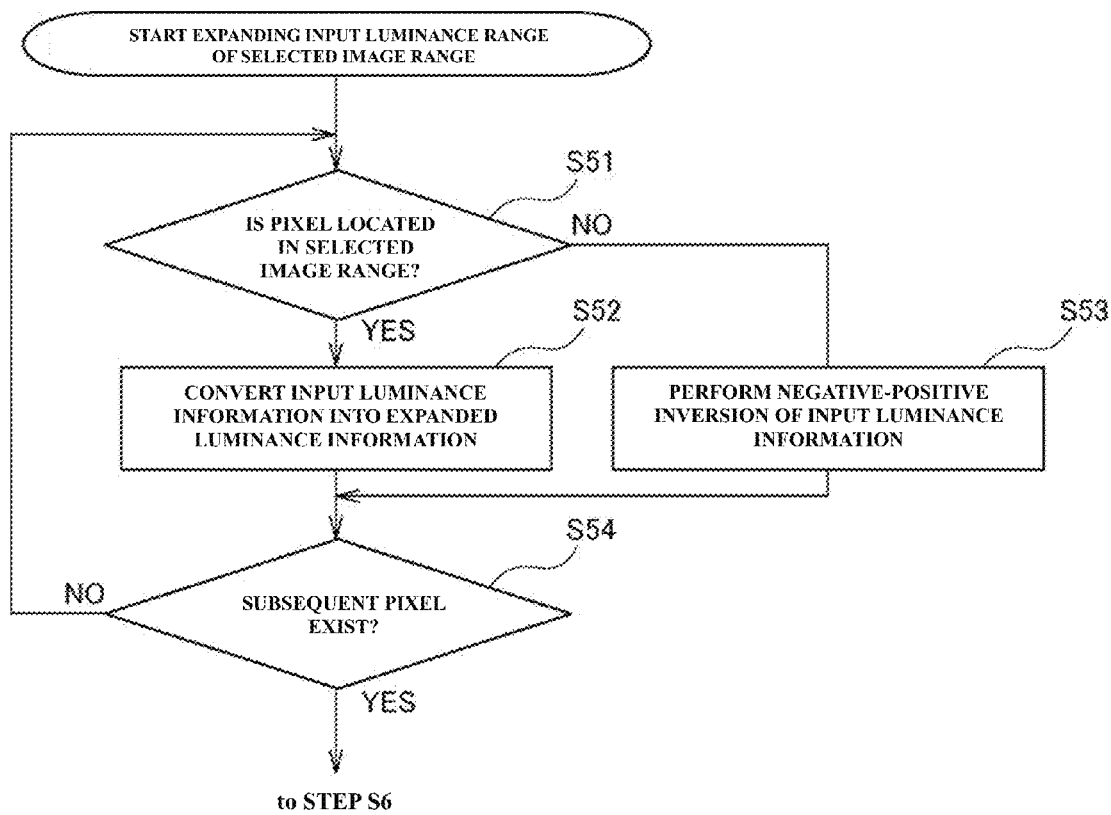
FIG. 12 is a flowchart of a process for each pixel in expansion of an input luminance range of a selected image range.

FIG. 12 is the flowchart of a process for each pixel in expansion of the input luminance range of the selected image range in FIG. 6.

In a step S51, it is determined whether or not a pixel is located within the selected image range. In this processing operation, the luminance range expansion unit 464 reads pixels one by one from the multi-gradation monochrome image data, and determines whether or not each thereof is a pixel located within the selected image range.

In a case where the read pixel is located within the selected image range, the process shifts to a step S52 (YES), and in a case where the read pixel is located outside the selected image range, the process shifts to a step S53 (NO).

In the step S52, the input luminance information is converted into the expanded luminance information. In this processing operation, as described in the step S5, the luminance range expansion unit 464 maps the input luminance information (luminance values) of pixels located within the selected image range into the output luminance range, based on the above-mentioned Expression (1).

On the other hand, in the step S53, the negative-positive inversion of the input luminance information is performed. In this processing operation, the negative-positive inversion unit 465 performs negative-positive conversion on the input luminance information of pixels read from the multi-gradation monochrome image data.

Once the step S52 or the step S53 is completed, the process shifts to a step S54.

In the step S54, it is determined whether or not a subsequent pixel exists. In this processing operation, the luminance range expansion unit 464 determines whether or not an unprocessed pixel exists within the multi-gradation monochrome image data.

In a case where a subsequent pixel exists, the process returns to the step S51, and subsequent processing operations are repeated (NO), and in a case where a subsequent pixel does not exist, the process shifts to the step S6 in FIG. 6 (YES).

From the above-mentioned image process, it is possible to reliably perform the process for each pixel in the expansion of the input luminance range of the selected image range.

From the above, the image forming apparatuses 4 of the first embodiment each include the input luminance range recognition unit 462 that determines, from the multi-gradation monochrome image data in which a portion of an image range is selected as a processing target, the input luminance range in which the input luminance information within the selected image range is distributed, the output luminance range recognition unit 463 that determines the output luminance range able to be dealt with by the image forming unit 44 for outputting the multi-gradation monochrome image, and the luminance range expansion unit 464 that maps the input luminance information within the selected image range into the output luminance range and expands the input luminance range within the range of the output luminance range.

Only the input luminance range within the selected portion of an image range within the multi-gradation monochrome image data is expanded, and thus, it becomes possible to output a more detailed image by increasing the number of gradations within the selected image range. Furthermore, even if the number of gradations within the selected image range is increased, there is no influence on an input luminance range outside the selected image range. Therefore, it becomes possible to keep the gradation balance of the entire image.

In other words, at the time of observing, for example, a multi-gradation monochrome image while focusing on a portion of an image range, it becomes possible to secure gradation reproducibility within the portion of an image range while keeping a balance as a whole.

As a result, it is possible to express a gradation difference for a tumor or the like marginally detectable by the display apparatus 31 in one of the image processing apparatuses 3, such as CRT, whose output luminance range is large, and it becomes possible to accurately diagnose the tumor or the like.

In addition, the image forming apparatuses 4 of the first embodiment each include the negative-positive inversion unit 465 that performs a negative-positive inversion process on input luminance information outside the selected image range.

It is possible to enhance an image within the selected image range by enlarging a gradation difference, compared with a surrounding negative-positive inverted image.

Since the luminance range expansion unit 464 expands the input luminance range of the input luminance information up to an output luminance range able to be dealt with by the image forming unit 44, it is possible to reliably increase the number of gradations within the selected image range.

Second Embodiment

Figure 13:
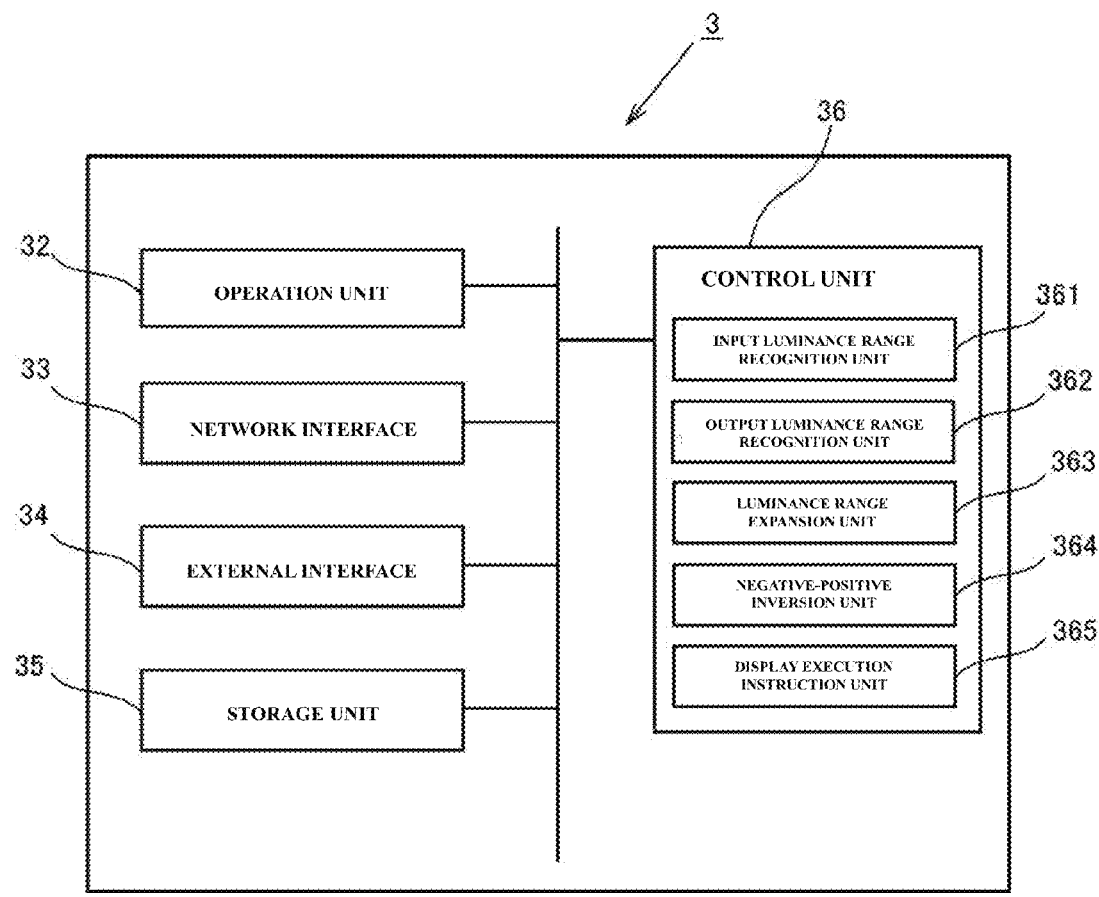
FIG. 13 is a schematic diagram illustrating a functional block configuration of a terminal apparatus according to a second embodiment of the present disclosure.

FIG. 13 is a schematic diagram illustrating the functional block configuration of a terminal apparatus serving as an information processing apparatus of a second embodiment in the present disclosure. Since the basic configuration of the second embodiment is in common with that of the first embodiment, similar symbols are assigned to corresponding configuration portions, and the description thereof will be omitted.

The terminal apparatuses 3 of the second embodiment each include at least an operation unit 32, a network interface 33, an external interface 34, a storage unit 35, and a control unit 36.

The operation unit 32 includes various kinds of mice, a keyboard, and so forth, and is an input apparatus that performs various kinds of input operations. A printing instruction for a multi-gradation monochrome image, issued to the image forming apparatus 4, and an operation for selection of an image range to be focused at that time (see the step S1 and so forth in FIG. 6), and so forth are performed by the operation unit 32.

The network interface 33 transmits and receives pieces of data to and from external apparatuses including the image generation apparatus 2 and the image forming apparatuses 4, via the network 5.

The external interface 34 is connected to the display apparatus 31, and has a display interface function used at the time of displaying a monochrome image or the like in the display apparatus 31.

The control unit 36 is an arithmetic apparatus such as a CPU, and performs various kinds of processing operations and various kinds of control operations by executing programs.

The storage unit 35 includes a ROM storing therein programs, a RAM as a working area, an HDD as an auxiliary storage apparatus, and so forth.

As illustrated in FIG. 13, in the terminal apparatus 3, the control unit 36 operates as an input luminance range recognition unit 361, an output luminance range recognition unit 362, a luminance range expansion unit 363, and a negative-positive inversion unit 364 that have the same functions as the input luminance range recognition function (see the input luminance range recognition unit 462), the output luminance range recognition function (see the output luminance range recognition unit 463), the luminance range expansion function (see the luminance range expansion unit 464), and the negative-positive inversion function (see the negative-positive inversion unit 465), respectively, and further operates as a display execution instruction unit 365.

The display execution instruction unit 365 realizes a display execution instruction function, and performs a process for displaying a multi-gradation monochrome image and so forth in the display apparatus 31. If a portion of an image range is selected by a user for a multi-gradation monochrome image displayed in the display apparatus 31, the display execution instruction unit 365 causes a multi-gradation monochrome image after the input luminance range of the image range is expanded to be displayed.

The input luminance range recognition unit 361, the output luminance range recognition unit 362, the luminance range expansion unit 363, and the negative-positive inversion unit 364 perform the same processing operations as those in the steps S1 to S6 in FIG. 6.

If a portion of an image range is selected, as a processing target, by an operation in the operation unit 32, the input luminance range recognition unit 361 determines a luminance range in which input luminance information within the selected image range is distributed, with respect to monochrome image data. The output luminance range recognition unit 362 determines an output luminance range supported by the image forming unit 44 (steps S1 to S4). The luminance range expansion unit 363 expands the input luminance range of the above-mentioned selected image range within the range of an output luminance range supported by the display apparatus 31 (step S5).

Based on after-expansion multi-gradation monochrome image data, the display execution instruction unit 365 performs displaying of a multi-gradation monochrome image in which the luminance range of a portion of an image range is expanded, on the display apparatus 31.

In the second embodiment, at the time of observing, for example, a multi-gradation monochrome image on the display apparatus 31 such as a monitor while focusing on a portion of an image range, it becomes possible to secure gradation reproducibility within the portion of an image range while keeping a balance as a whole.

As a result, it is possible to clearly express a gradation difference for a tumor or the like marginally detectable by, for example, the display apparatus 31 in the image processing apparatus 3-1, and it becomes possible to accurately diagnose the tumor or the like.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus comprising:
an image forming unit configured to print an image, based on a printing instruction;
an input luminance range recognition unit configured to i) acquire input luminance information from multi-gradation monochrome image data in which a portion of an image range is selected, ii) generate a luminance histogram, and iii) determine, based on a minimum luminance value and a maximum luminance value of the luminance histogram, an input luminance range in which input luminance information of the image range is distributed;
an output luminance range recognition unit configured to determine an output luminance range supported by the image forming unit; and
a luminance range expansion unit configured to i) perform a mapping process for mapping input luminance information of pixels within the image range into the output luminance range, and ii) expand the input luminance range to a maximum luminance range to be dealt with by the image forming unit,
wherein an after-expansion luminance value after the mapping process is calculated based in the following equation:

$$\text{after-expansion luminance value} = [(\text{before-expansion luminance value} - \text{min})/(\text{max} - \text{min})] \cdot 2^N,$$

wherein, min is minimum color value of the luminance histogram, max is a maximum color value of the luminance histogram, and N is the number of bits in which gradation expression in the image forming apparatus is available.

2. The image forming apparatus according to claim 1, wherein
the mapping process includes mapping luminance values ranging from a minimum luminance value of the input luminance range within the image range to a maximum luminance value thereof, as luminance values ranging from a minimum luminance value of the output luminance range to a maximum luminance value thereof.

3. The image forming apparatus according to claim 1, further comprising:
a negative-positive inversion unit configured to perform a negative-positive inversion process for input luminance information outside the image range.

4. The image forming apparatus according to claim 1, further comprising:
a color conversion unit configured to convert after-expansion multi-gradation monochrome image data including the expanded input luminance information into CMYK values serving as a color space of process colors of the image forming unit; and a gamma correction process unit configured to perform gamma correction on the CMYK-converted after-expansion multi-gradation monochrome image data.

5. The image forming apparatus according to claim 1, wherein the image forming unit is configured to print a multi-gradation monochrome image, based on after-expansion multi-gradation monochrome image data including the expanded input luminance information.

6. An image forming method comprising:

acquiring input luminance information from multi-gradation monochrome image data in which a portion of an image range is selected;

generating a luminance histogram;

determining, based on a minimum luminance value and a maximum luminance value of the luminance histogram, an input luminance range in which input luminance information of the image range is distributed;

determining an output luminance range supported by the image forming unit; performing a mapping process for mapping input luminance information of pixels within the image range into the output luminance range; and expanding the input luminance range to a maximum luminance range to be dealt with by the image forming unit, wherein an after-expansion luminance value after the mapping process is calculated based in the following equation:

$$\text{after-expansion luminance value} = [(\text{before-expansion luminance value} - \text{min})/(\text{max} - \text{min})] \cdot 2^N,$$

wherein, min is a minimum color value of the luminance histogram, max is a maximum color value of the luminance histogram, and N is the number of bits in which gradation expression in the image forming apparatus is available.

7. The image forming method according to claim 6, wherein the mapping process includes mapping luminance values ranging from a minimum luminance value of the input luminance range within the image range to a maximum luminance value thereof, as luminance values ranging from a minimum luminance value of the output luminance range to a maximum luminance value thereof.

8. The image forming method according to claim 6, further comprising:

performing a negative-positive inversion process for input luminance information outside the image range.

9. The image forming method according to claim 6, further comprising:

converting after-expansion multi-gradation monochrome image data including the expanded input luminance information into CMYK values serving as a color space of process colors of the image forming unit; and performing gamma correction on the CMYK-converted after-expansion multi-gradation monochrome image data.

10. The image forming method according to claim 6, wherein printing a multi-gradation monochrome image, based on after-expansion multi-gradation monochrome image data including the expanded input luminance information.

11. A terminal apparatus serving as an information processing apparatus, the terminal apparatus comprising:

an operation unit configured to receive data from an image generation apparatus and to receive an input operation indicating a selection of an image range in the multi-gradation monochrome image;

an external interface connected to a display apparatus;

a control unit, wherein the control unit operates as an input luminance range recognition unit, an output luminance range recognition unit, a luminance range expansion unit, and a negative-positive inversion unit, wherein the input luminance range recognition unit is configured to i) acquire input luminance information from the multi-gradation monochrome image data in which a portion of an image range is selected, ii) generate a luminance histogram, and iii) determine, based on a minimum luminance value and a maximum luminance value of the luminance histogram, an input luminance range in which input luminance information of the image range is distributed;

an output luminance range recognition unit configured to determine an output luminance range supported by the display apparatus; and a luminance range expansion unit configured to i) perform a mapping process for mapping input luminance information of pixels within the image range into the output luminance range, and ii) expand the input luminance range to a maximum luminance range supported by the display apparatus; and a display execution instruction unit that realizes a display execution instruction function, and performs a process for displaying a multi-gradation monochrome image on the display apparatus, wherein an after-expansion luminance value after the mapping process is calculated based in the following equation:

$$\text{after-expansion luminance value} = [(\text{before-expansion luminance value} - \text{min})/(\text{max} - \text{min})] \cdot 2^N,$$

wherein, min is a minimum color value of the luminance histogram, max is a maximum color value of the luminance histogram, and N is the number of bits in which gradation expression in the display apparatus is available.

12. The terminal apparatus according to claim 11, wherein the mapping process includes mapping luminance values ranging from a minimum luminance value of the input luminance range within the image range to a maximum luminance value thereof, as luminance values ranging from a minimum luminance value of the output luminance range to a maximum luminance value thereof.

13. The terminal apparatus according to claim 11, further comprising:

a negative-positive inversion unit configured to perform a negative-positive inversion process for input luminance information outside the image range.

14. The terminal apparatus according to claim 11, wherein the display apparatus is configured to display a multi-gradation monochrome image, based on after-expansion multi-gradation monochrome image data including the expanded input luminance information.

* * * * *